Sept. 9, 1958  M. F. CLARKE  2,850,899
SELF-RECORDING GAUGES FOR MAXIMUM PRESSURE AND
PRESSURE-TIME MEASUREMENTS ON SHOCK WAVES
Filed May 12, 1954  2 Sheets-Sheet 2
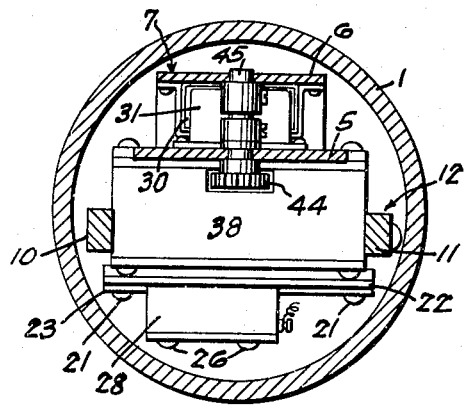
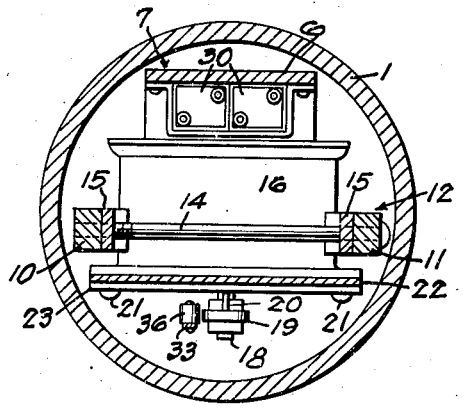
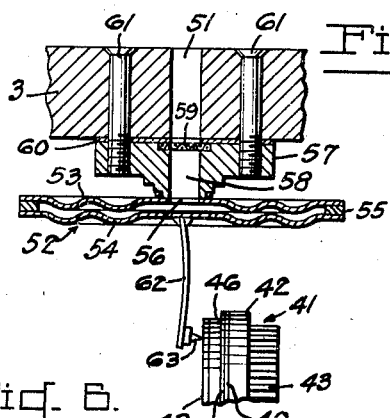
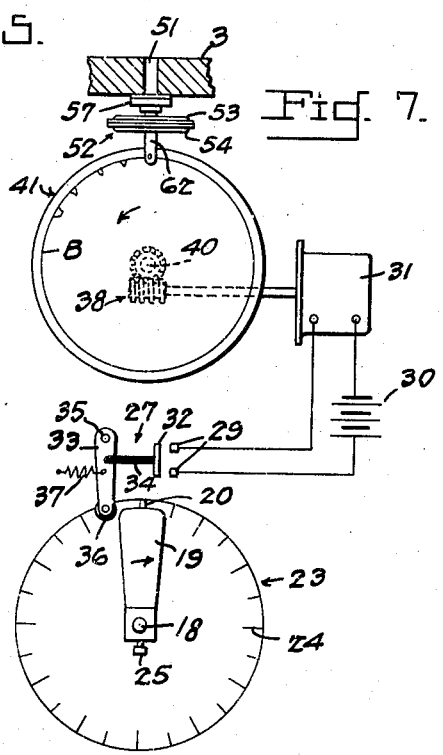
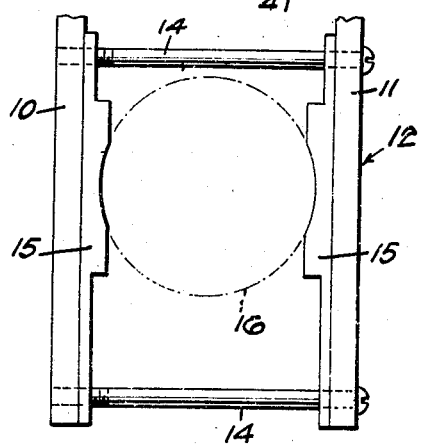
INVENTOR.
Marvin F. Clarke
BY
W. E. Thibodeau, A. W. Dew
and D. P. Smith  ATTORNEYS

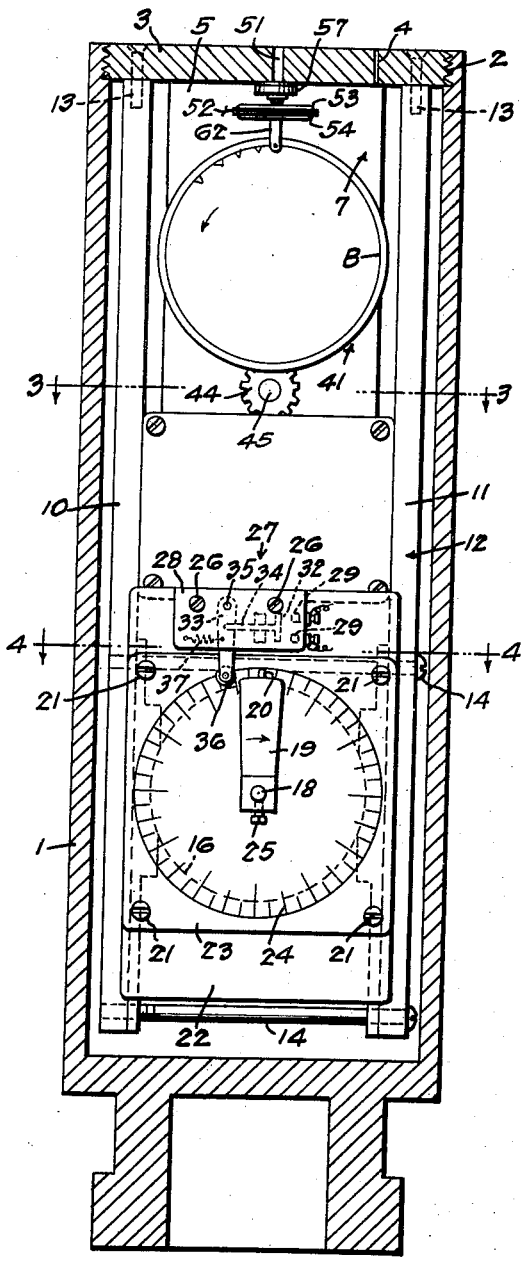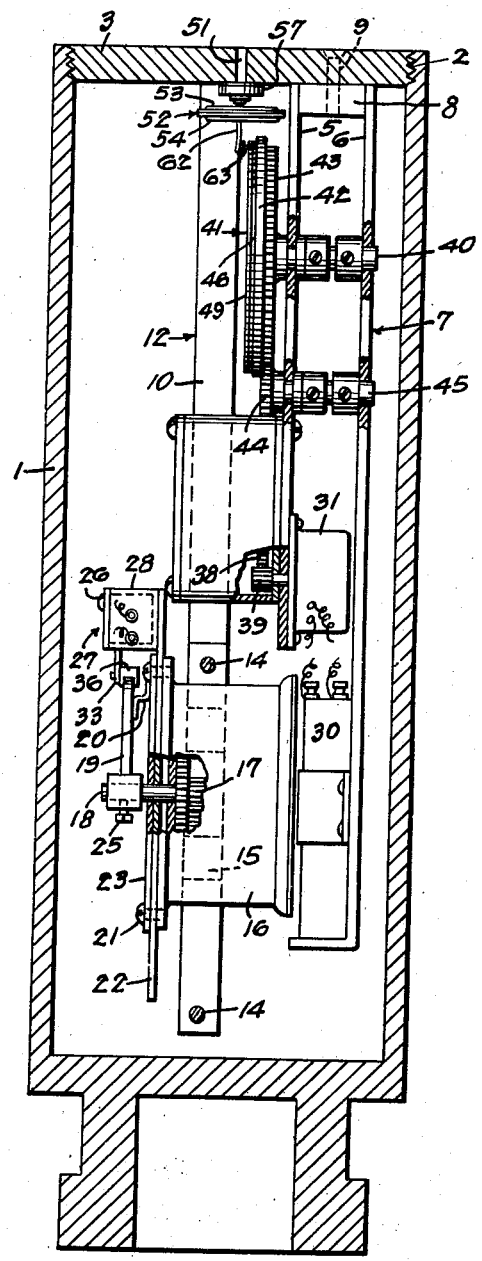

United States Patent Office 2,850,899
Patented Sept. 9, 1958

2,850,899

SELF-RECORDING GAUGES FOR MAXIMUM PRESSURE AND PRESSURE-TIME MEASUREMENTS ON SHOCK WAVES

Marvin F. Clarke, Dallas, Tex., assignor to the United States of America as represented by the Secretary of the Army Application May 12, 1954, Serial No. 429,415

1 Claim. (Cl. 73—391)

(Granted under Title 35, U. S. Code (1952), sec. 266)

The invention described herein may be manufactured and used by or for the Government for governmental purposes without the payment to me of any royalty thereon.

This invention relates to pressure recording gauges.

While testing various explosive powders it has been found desirable to have a permanent record made showing the intensity and duration of the pressures as manifested in the accompanying shock waves. The gauge herein disclosed operates to measure the maximum pressure of a shock wave of long duration and varying pressures. The shock pressure enters a pressure sensing capsule, to which is attached a stylus, and causes displacement of the stylus to scratch a record of the shock waves on a blank disk. The disk is rotated past the stylus by time-controlled means so that a series of tests may be made during a predetermined time interval after the gauge has been readied for use.

An object of the invention is to provide a recording device which can be set to operate at a predetermined time concident with the firing of test charges of explosives.

Another object of the invention is to provide a recording device which can be calibrated at the point of use so that the recordings will read from a base line which indicates the ambient barometric pressure at that point.

Another object of the invention is to provide a recording device which will inscribe a curve for each explosion showing varying intensity and duration of the accompanying shock wave.

A further object of the invention is to provide a recording device which will inscribe a record of the time of duration of each shock wave.

A still further object of the invention is to provide a device which can be assembled within a stout housing for protection of its various delicate parts from the heat and shock waves of the explosive being tested.

Other objects and advantages will be apparent from the following detailed description and the accompanying drawings, in which:

Figure 1 is a longitudinal sectional view of the housing showing the various elements in front elevation:

Figure 2 is a longitudinal sectional view of the housing taken at a 90° angle to Figure 1 and showing the elements in side elevation;

Figure 3 in a cross sectional view of the device taken on the line 3—3 of Figure 1 and looking in the direction of the arrows:

Figure 4 is a cross sectional view of the device taken on the line 4—4 of Figure 1 and looking in the direction of the arrows:

Figure 5 is an enlarged sectional view of the pressure sensitive capsule and associated parts:

Figure 6 is a detail view of the clamp means for supporting the clock mechanism; and Figure 7 is a schematic view showing the interconnection of the various elements.

Referring now to the drawings, wherein one form of the invention is shown, a housing 1 of any desired configuration encloses the entire device. Secured to the normally upper open end of the housing as by screw threads 2 is a cover 3. The housing is air tight except for a small hole 4, shown greatly enlarged for purposes of illustration, in the cover to permit equalization of pressure inside and outside the housing in the event that there be a change in ambient temperature or barometric pressure after the cover 3 is secured in place. The hole 4 is formed to be too small to permit equalization of pressure inside and outside the housing during the short time that the shock pressure exists adjacent the gauge.

A pair of elongated plates 5 and 6 comprising a first support 7 depend from the cover 3 and are secured to a mounting block 8, by welding or other desired means. The block is thereafter secured to the cover by screw means 9. A pair of elongated bars 10 and 11 comprising a second support 12 also depend from the cover and are secured thereto by screws 13. Secured near the lower end of the second support, as by the elongated screws 14, is a pair of oppositely concaved cradle blocks 15 which embrace and support the casing 16 of a clock mechanism 17 (shown schematically in the drawings) of usual construction. Sufficient clamping action of the cradle blocks is supplied by applying torsion to the screws 14. An hour arbor 18 of usual form protrudes from the clock mechanism and carries an arm 19 having an enlarged free end and a pointer 20. Secured to the front of the clock casing by screws 21 or the like is a plate 22 which in turn carries a dial 23 having graduations 24 indicating divisions of time to cooperate with the pointer 20 when the device is set to operate at a preselected future time. A set screw 25 threaded into the hub of arm 19 reacts against the arbor 18 to secure the arm in any selected position.

The upper part of plate 22 extends above the dial 23 and has secured thereto, as by the screws 26, a switch mechanism 27 enclosed in a cover 28. Terminal blocks 29 of an electric circuit including a battery 30 and a motor 31 are carried by and insulated from the cover 28 and are engaged by a circuit closer 32 of the switch mechanism when the device is in operating condition. The switch mechanism further includes a lever 33 connected to the circuit closer 32 by a link 34 which causes the circuit closer to move with the movement of the lever. A pivot element 35 secures the upper end of the lever 33 for pivotal movement while the lower end thereof depends into the path of rotation of the outer end of the arm 19 on the arbor 18, an antifriction roller 36 on the lower end of the lever receives the wiping action of the arm end. A spring structure 37 holds the switch mechanism in open position and together with the lever 33 and the arm 19 form a trip mechanism for opening and closing the circuit to the motor and battery.

The motor 31 is connected to a suitable speed reduction gearing 38 by a pinion 39 fixed to the motor shaft. Both motor and reduction gearing are carried by the first support 7.

Journalled in bearings formed in the support 7 adjacent the speed reduction gearing is a shaft 40 which carries a turntable structure 41 including a disk 42, to one face of which is secured a gear wheel 43. A pinion 44, in mesh with the reduction gearing and the gear wheel 43, is carried on a shaft 45 also journalled in the support 7. As best shown in Figure 5, the face of disk 42 opposite the gear 43 carries a record receiving blank composed of a glass disk 46 slightly smaller in diameter than the turntable disk 42. A paper disk 47 is first attached to the turntable disk 42 by a thin layer of cement 48. The glass recording blank has its recording side coated with any suitable paste that will dry quickly and present a scribable surface.

This paste 49 is brushed or sprayed on the glass. The glass recording blank disk 46 is then attached to the paper disk 47 by a few drops of cement. By this method the glass disk is easily removed from turntable after a recording has been made.

The cover 3 is formed with a central opening 51 to admit shock pressures to enter a pressure sensing capsule 52 secured to the cover adjacent the recording disk. Two concentrically corrugated flexible disks or diaphragms 53 and 54 are joined at their peripheries in spaced pressure tight relationship by solder or other suitable means 55 to form an expansion chamber therewithin. The disk 53 has an orifice 56 (see Figure 5) centrally formed therein and is secured to a ring 57 which is attached in pressure tight relationship to the cover. A bore 58 is formed in the ring 57 in axial alignment with the opening 51 in the cover and the orifice 56 in the flexible disk 53. A screen 59 is placed in the bore 58 to exclude particles carried by the blast. In order to effect a pressure tight connection between the ring 57 and cover 3 a gasket 60 is interposed therebetween and the ring is drawn up in close contact by screws 61. A flexible bar 62 centrally secured to the flexible disk 54 at one end, depends into close proximity with the outer rotatable recording surface 49 of the recording disk 46. At its distal end the bar 62 carries a stylus 63. The bar is so secured to the flexible disk 54 that it normally assumes a position at an angle of about 15° to the axes of bores 51 and 58, and when assembled with the recording disk its spring bias will hold the stylus in constant and uniform contact with the surface of the recording disk substantially as shown.

The operation of the invention is as follows:

The housing 1 is preferably formed of corrosion resistant materials or if otherwise formed it will be protected from the elements by painting, plating or other means. One of the most satisfactory methods of setting the gauge in use, is to bury it in the ground with the outer surface of the cover flush with the ground surface.

When the gauge has been brought to the point of use and before final assembly it is only necessary to manually press the lever 33 which operates the switch mechanism 27. Energy will be fed from the batteries 30 to the motor 31 and through the gearing 38 the turntable 41 will rotate to inscribe a concentric base line B in the record receiving coating 49 on the glass disk. The lever 33 is then released and its spring 37 returns it to normal position. The arm 19 is adjusted on the hour arbor 18 of the clock mechanism at a predetermined distance from the lever in accordance with the time set for explosive tests and the assembly, together with the cover 3, is positioned in the housing in pressure tight condition. The small hole 4 in the cover permits equalization of ambient pressure and temperature within and without the housing but as previously explained, is too small to permit equalization of pressure during the short time interval that the shock pressures exist outside the housing.

When the preselected time for testing explosives arrives, the arm 19 will have travelled clockwise until the leading edge of its free end contacts the roller 36 on the lever 33. The lever moves about its pivot element 35 and causes the electric circuit to be closed and the motor 31 again rotates the turntable 41. As the turntable rotates the stylus will follow the base line B previously inscribed on the record disk 46. As each separate explosion occurs pressure will enter the expansion chamber in the capsule 52 and flex the disks 53 and 54 to place a downward thrust on the bar 62 which will in turn move the stylus downwardly and inscribe a line beyond the base line B to indicate intensity of shock wave. At the same time, due to timed rotation of the record disk the stylus will inscribe a curve of intensity and duration as shown in Figures 1 and 7. When shock pressures have subsided the stylus will return to the base line B and the operation will be repeated for each succeeding shock wave. The test explosions are timed to occur during the time that the arm 19 holds the switch closed. When the arm has rotated out of contact with the lever 33 and its roller 36, the spring 37 will return the lever to its normal position to open the switch and stop the motor. Thus the lever 33 serves as a tripping device to open and close the switch.

While I have disclosed a form of the invention presently preferred by me, various changes and modifications will occur to those skilled in the art after a study of the present disclosure. Hence the disclosure is to be taken in an illustrative rather than a limiting sense; and it is my desire and intention to reserve all modifications falling within the scope of the subjoined claim.

Having now fully disclosed the invention what I claim and desire to secure by Letters Patent is:

In a gauge for recording the measurement and duration of atmospheric shock pressures the combination comprising a turntable journalled for rotation and comprising a gear on one face and a record receiving disk on the other face, a drive comprising a motor and a speed reduction gear train in mesh with said turntable gear to reduce the speed of rotation of the turntable a predetermined amount, a source of electric energy, a clock mechanism comprising a rotating arbor carrying an arm adjustable circumferentially of said arbor and provided at its free end with an index pointer, a time indicating chart concentrically disposed about said arbor to cooperate with said pointer when advance time setting is to be determined, a normally open switch mechanism to connect said motor and said source of energy, a pivoted switch lever in said switch the free end of which projects into the path of said rotating arm to close the switch at a preselected time, and a pressure sensing mechanism comprising a pair of spaced concentrically disposed corrugated flexible disks secured in pressure tight contact at their respective peripheries to provide an expansion chamber interiorly thereof one of said flexible disks having a central orifice open to atmosphere, a flexible bar on the other of said flexible disks and centrally positioned thereon, the distal end of said bar provided with a stylus normally in contact with the record receiving surface of said rotating disk.

References Cited in the file of this patent

UNITED STATES PATENTS

| | | |
|---|---|---|
| 1,103,691 | Schuch | July 14, 1914 |
| 1,115,778 | Bristol | Nov. 3, 1914 |
| 1,161,376 | Bristol | Nov. 23, 1915 |
| 2,377,182 | Raspet | May 29, 1945 |
| 2,601,778 | Gordon | July 1, 1952 |

OTHER REFERENCES

Allied Radio, Catalog No. 131, 1953 (833 W. Jackson Blvd., Chicago 7, Illinois), pp. 139.